United States Patent
Muschaweck et al.

(10) Patent No.: US 10,627,515 B2
(45) Date of Patent: Apr. 21, 2020

(54) CAMERA SYSTEM WITH LASER-BASED RANGEFINDER

(71) Applicant: ARNOLD & RICHTER CINE TECHNIK GMBH & CO. BETRIEBS KG, München (DE)

(72) Inventors: Julius Muschaweck, Gauting (DE); Michael Haubmann, Vienna (AT)

(73) Assignee: ARNOLD & RICHTER SINE TECHNIK GMBH & CO. BETRIEBS KG, München (DE)

( * ) Notice: Subject to any disclaimer, the term of this patent is extended or adjusted under 35 U.S.C. 154(b) by 0 days.

(21) Appl. No.: 16/217,517

(22) Filed: Dec. 12, 2018

(65) Prior Publication Data

US 2019/0187282 A1 Jun. 20, 2019

(30) Foreign Application Priority Data

Dec. 14, 2017 (DE) ........................ 10 2017 130 012

(51) Int. Cl.
*G01S 17/08* (2006.01)
*G01S 7/481* (2006.01)
(Continued)

(52) U.S. Cl.
CPC ............ *G01S 17/08* (2013.01); *G01S 7/4814* (2013.01); *G01S 7/4817* (2013.01); *G02B 7/09* (2013.01);
(Continued)

(58) Field of Classification Search
CPC .............................. G01S 17/08; G01S 17/4814
See application file for complete search history.

(56) References Cited

U.S. PATENT DOCUMENTS 4,481,413 A * 11/1984 Wilwerding ........... G02B 7/282
250/204
5,703,351 A 12/1997 Meyers
(Continued)

FOREIGN PATENT DOCUMENTS

| DE | 101 11 245 A1 | 3/2002 |
| DE | 103 12 682 A1 | 10/2003 |
| WO | 2006/012859 A2 | 2/2006 |

OTHER PUBLICATIONS

German Search Report dated Dec. 14, 2017 as recevied in Application No. 102017130012.0.

*Primary Examiner* — Noam Reisner
(74) *Attorney, Agent, or Firm* — Maschoff Brennan (57) ABSTRACT

A camera system includes a camera unit for capturing still or moving images of an object. The camera unit is adjustable in respect of at least one parameter relevant to the capture of the images based on a measurement signal. A measuring unit captures a distance between the object and the camera unit and includes a laser transceiver for emitting a laser signal and receiving a laser signal reflected by the object. An evaluation unit coupled to the laser transceiver provides the measurement signal. The measurement signal indicates the distance between the object and the camera unit. A lens system has at least two spaced apart lenses. The laser signal emitted by the laser transceiver passes through the lens system. At least one of the lenses is arranged in movable fashion such that the distance between the lenses is variably adjustable parallel to the laser signal transmission direction.

17 Claims, 6 Drawing Sheets

(51) Int. Cl.
*G02B 15/14* (2006.01)
*G02B 7/10* (2006.01)
*G03B 5/00* (2006.01)
*G03B 13/20* (2006.01)
*G02B 7/09* (2006.01)
*G02B 27/64* (2006.01)
*G03B 13/16* (2006.01)
*G02B 27/00* (2006.01)
*H04N 5/232* (2006.01)

(52) U.S. Cl.
CPC ............... *G02B 7/10* (2013.01); *G02B 15/14* (2013.01); *G02B 27/646* (2013.01); *G03B 5/00* (2013.01); *G03B 13/16* (2013.01); *G03B 13/20* (2013.01); *G02B 27/0081* (2013.01); *G03B 2205/0007* (2013.01); *H04N 5/232121* (2018.08)

(56) References Cited

U.S. PATENT DOCUMENTS

| | | |
|---|---|---|
| 6,151,118 A | 11/2000 | Norita et al. |
| 8,363,152 B2 | 1/2013 | Haubmann et al. |
| 9,377,302 B2 | 6/2016 | Frischman et al. |
| 2004/0090667 A1 | 5/2004 | Gartner et al. |
| 2013/0286375 A1 | 10/2013 | Yu |
| 2014/0104591 A1 | 4/2014 | Frischman et al. |
| 2016/0245919 A1 | 8/2016 | Kalscheur et al. |
| 2016/0248969 A1* | 8/2016 | Hurd ................. H04N 5/23216 |
| 2017/0234972 A1* | 8/2017 | Takizawa ................. G01C 3/06 356/5.01 |
| 2017/0363839 A1* | 12/2017 | Sato ....................... H04N 5/232 |
| 2018/0252811 A1* | 9/2018 | Park ......................... G08G 1/04 |

* cited by examiner

CAMERA SYSTEM WITH LASER-BASED RANGEFINDER

This application claims priority of DE 10 2017 130 012.0, filed Dec. 14, 2017, the content of which is incorporated herein in its entirety.

TECHNICAL FIELD

The present invention relates to embodiments of a camera system with a laser-based measuring unit, which measures the distance between a camera unit of the camera system and an object to be captured by the camera unit

BACKGROUND

WO 2006/012859 A2 has disclosed a camera system, in which provision is made of a measuring unit, which measures the distance between a camera unit of the camera system and an object to be captured by the camera unit. The measuring unit is a laser-based measuring unit and the camera unit can be set, for example in respect of an image sharpness, on the basis of a measurement signal provided by this measuring unit. By way of example, this can be implemented automatically by virtue of an objective lens of the camera unit being set appropriately.

Further, document U.S. Pat. No. 9,377,302 B2 describes a laser-based distance measuring unit, in which provision is made of a lens system of modular design, said lens system serving to convert a punctiform laser beam into a line-shaped beam. Depending on the application, the lens system can be equipped with different individual lenses.

In view of the recording quality, it is desirable for a measurement value specifying as exactly as possible the current distance between the object to be captured by way of the camera and the camera unit to be available at all times such that the camera unit can be set on the basis thereof, either automatically or manually.

DESCRIPTION

According to one embodiment, a camera system comprises: a camera unit for capturing still and/or moving images of an object, wherein the camera unit is adjustable in respect of at least one parameter that is relevant to the capture of the still and/or moving images on the basis of a measurement signal; and a measuring unit for capturing a distance between the object and the camera unit. The measuring unit comprises: a laser transceiver for emitting a laser signal and for receiving a laser signal reflected by the object; an evaluation unit that is coupled to the laser transceiver and that is embodied to provide the measurement signal, wherein the measurement signal is indicative for the distance between the object and the camera unit; and a lens system, which has at least two spaced apart lenses, the laser signal emitted by the laser transceiver passing through said lens system, wherein at least one of the lenses is arranged in movable fashion such that the distance between the at least two lenses is variably adjustable parallel to the laser signal transmission direction.

Further features and advantages will become clear to a person skilled in the art in light of the study of the following detailed description and observation of the attached drawings.

BRIEF DESCRIPTION OF THE DRAWINGS

The parts shown in the figures are not necessarily true to scale; rather, the emphasis lies in presenting principles of the invention. Further, the same reference signs denote parts corresponding to one another in the figures. In the figures.

DETAILED DESCRIPTION

In the following detailed description, reference is made to the attached drawings, which show how the invention can be implemented in practice by elucidating specific embodiments.

Reference is now made in detail to various embodiments and to one or more examples, which are elucidated in the figures. Each example is presented in explanatory fashion and should not be construed as restricting the invention. By way of example, elucidating features or features described as part of one embodiment can be applied to, or in conjunction with, other embodiments in order to reveal an even further embodiment. It is intended that the present invention comprises such modifications and variations. The examples are described using specific language that should not be construed as restricting the scope of protection of the attached claims. The drawings are not a reproduction that is true to scale and only serve elucidating purposes. For the purposes of a better understanding, the same elements are denoted by the same reference signs in the various drawings provided nothing else is specified.

Figure 1:
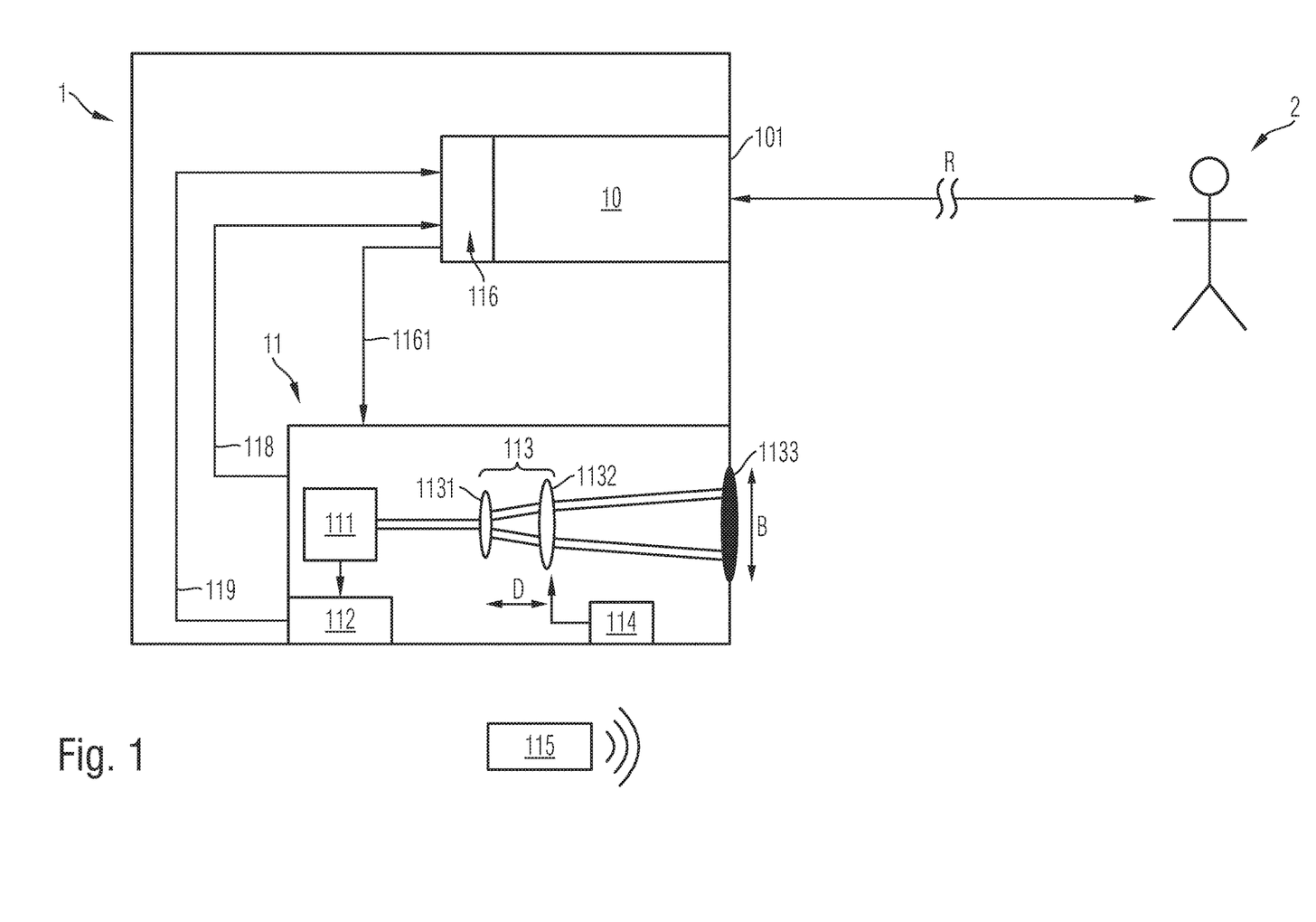
FIG. 1 shows a camera system according to one or more embodiments in a schematic and exemplary fashion.

FIG. 1 shows an embodiment of a camera system 1 in schematic and exemplary fashion. The camera system 1 comprises a camera unit 10 for capturing still and/or moving images of an object 2, such as a person, object, a scenery element, etc.

By way of example, the camera system 1 is embodied to be used within the scope of cinematography, i.e., for example, for recording a documentary, a movie and the like. The camera system 1 may be a cinematographic camera system 1.

By way of example, the camera unit 10 comprises the usual components of a camera, which are not illustrated in any more detail in FIG. 1. Such components include, for example, a camera optical unit with at least one objective lens 101, at least one image sensor, a camera controller 116 with digital signal processing means, electromechanical adjustment mechanisms (which, e.g., may be coupled to the camera controller 116), electronic storage for storing image data, etc. The details of exemplary embodiments of the camera unit 10 will not be discussed in more detail here. The camera unit 10 can be embodied to be used within the scope of cinematography, i.e., for example, for recording a documentary, a movie and the like. The camera unit 10 may be a cinematographic camera unit 10.

In view of the aforementioned optional components, which may form part of the camera unit 10, provision can be made for the camera unit 10 to be adjustable in respect of at least one parameter that is relevant to the capture of the still and/or moving images on the basis of a measurement signal. The at least one parameter that is relevant to the capture of the still and/or moving images may be the following: a focal length, an image sharpness, a resolution, a focus, a lens position, or a control parameter relating to the image stabilization. According to an embodiment, the camera controller 116 is embodied to set at least one parameter that is relevant to the capture of the still and/or are moving images, for example the focus and/or the focal length and/or an image sharpness.

By way of example, the image sharpness can be set when recording the still and/or moving images by virtue of the optical unit of the camera unit 10 being set accordingly. To this end, provision is made of, e.g., an electromechanical adjustment mechanism (not illustrated here), e.g., an objective lens motor which sets the optical unit of the camera unit 10 on the basis of the measurement signal (or of a signal derived therefrom).

The camera system 1 further comprises a measuring unit 11 for capturing a distance R ("range") between the camera unit 10 and the object 2 to be captured by the camera unit 10. By way of example, the measuring unit is embodied as a so-called "rangefinder" of the camera system 1. In one embodiment, the measuring unit 11 is fastened to, or installed in, the camera system 1 in such a way that the distance between the measuring unit 11 and the object 2 is at least virtually identical to the distance between the object 2 and the camera unit 10 (e.g., between the object 2 and objective lens 101). At a later point, there will be an even more detailed discussion on possible differences between the object-measuring unit distance on the one hand and the object-camera unit distance on the other hand.

It is understood that the distance R between the camera unit 10 (or the objective lens 101 thereof capturing the light) and the object 2 to be captured is relevant to the correct setting of the camera unit 10. Therefore, it is desirable for the actual distance to be known at all times, particularly in the case of moving objects and/or in the case where the camera system 1 is moving, i.e., in situations in which there is a continuous change in the distance between the object 2 and the camera unit 10 during the recording.

Therefore, the measuring unit 11 comprises a laser transceiver 111 for emitting a laser signal L (see FIGS. 3A-C) and for receiving a laser signal reflected by the object 2, and an evaluation unit 112 coupled to the laser transceiver 111, said evaluation unit 112 being embodied to provide the measurement signal 119, wherein the measurement signal 119 is indicative for the distance R between the object 2 and the camera unit 10.

By way of example, the measuring unit 11 is embodied to report the measurement signal 119 with a rate of at least 200 Hz, i.e., to undertake a distance measurement at least two hundred times per second, and, accordingly, update the measurement signal 119 at least two hundred times per second. Here, the measurement signal 119 can be output as a digital signal in a format that for example may be predetermined by a communications standard, which may even be a proprietary communications standard. One embodiment ensures that signal processing means (not illustrated here) of the camera controller 16 of the camera unit 10 are able to correctly receive and read the measurement signal 119 and, optionally, are able to undertake automatic setting of the camera unit 10, for example, automatic setting of the image sharpness, on the basis thereof.

The fundamental principles of laser-based distance measurement are known from the prior art, and so details of the evaluation unit 12 and the coupling thereof to the laser transceiver 111 will not be discussed in more detail here in view of these fundamental principles.

However, in general, not every laser-based distance measuring system is ideal in every application, but only in very certain scenarios. By way of example, some laser-based distance measuring systems are suitable for measuring relatively large distances while others are suitable for measuring relatively small distances.

However, the camera system 1 is sometimes used in a multiplicity of different applications, and so, it is desirable per se, to also adapt or set the measuring unit 11 to the respective application. To this end, the provision of a modular measuring unit, in which individual lenses of the measuring unit can be removed by hand and/or can be replaced by another lens, is known from the document U.S. Pat. No. 9,377,302 B2, which was already cited at the outset. However, this approach was found to be impractical since, firstly, it is necessary to always carry along interchange lenses and the manual outlay for changing the lenses is significant. Moreover, the lens system may be damaged and/or dirtied by the necessary change of the lenses, which may lead to a short service life and/or a higher susceptibility of the system to defects. Depending on the number of interchange lenses, such a modular system may also be expensive. Moreover, in the case of darkness, for example, the type of the interchange lens is not, or at least not readily, identifiable and thus there may be (specifically, if the wrong type is selected) maladjustments in the measuring unit known in advance and consequently measurement errors and consequently maladjustments of the camera; the quality of the recording would deteriorate.

Against this background, a lens system 113 is provided in the measuring unit 11 of the camera system 1 presented here, said lens system having at least two spaced apart lenses 1131, 1132, the laser signal L emitted by the laser transceiver 111 passing through said lens system. At least one of the lenses 1131, 1132 is arranged in movable fashion such that the distance D between the at least two lenses 1131, 1132 is variably adjustable parallel to the laser signal transmission direction. This allows simple setting of the measuring unit 11 to the respective application, and it is not necessary to manually interchange lenses.

The adjustability of the distance D between the two lenses 1131, 1132 can be realized in different ways. Initially, it is possible for only one of the two lenses 1131, 1132 to have a movable arrangement. In another embodiment, both lenses 1131, 1132 are arranged to be movable independently of one another parallel to the laser signal transmission direction.

In one embodiment, the distance D between the two lenses 1131, 1132 is continuously adjustable, as a result of which, in particular, it is also possible for the width B of the line-shaped laser signal output at a front lens 1333, i.e. the expansion of the laser beam, to be continuously adjustable, which will be described in more detail below.

Moreover, the measuring unit 11 can have an electric drive arrangement 114, which is embodied and arranged to set the distance D between the two lenses 1131, 1132. By way of example, the electric drive arrangement 114 comprises a linear motor which guides a shaft, on which one of the two lenses 1131, 1132 is arranged, parallel to the laser signal transmission direction.

Further, the camera system 1 may include remote control 115, wherein the electric drive arrangement 114 can be embodied to set the distance between the at least two lenses 1131, 1132 on the basis of a control signal output by the remote control 115. As an alternative or in addition thereto, such a control signal, however, may also be provided by a user interface (not illustrated) of the camera system 1 and/or of the camera unit 10 and/or by current operating parameters of the camera unit 10. By way of example, the distance D between the two lenses 1131, 1132 being set automatically depending on a current setting of the camera unit 10 also lies within the scope of the invention.

According to one embodiment, the camera controller 116 is coupled to the measuring unit 11 and embodied to supply a controller signal 1161 to the measuring unit 11. The measuring unit 11 can be set automatically on the basis of the controller signal 1161. By way of example, the camera controller 116 is embodied to set (e.g., depending on a current focal length setting the camera unit 10) the distance D between the two lenses 1131 and 1132 by means of the controller signal 1161. As an alternative or in addition thereto, the camera controller 160 is embodied in one embodiment to set (e.g., depending on a current focal setting of the camera unit 10) a transmission power of the laser transceiver 111 by means of the controller signal 1161. By way of example, the camera controller 116 can implement an automatic gain control (AGC) regulation in the laser transceiver 111 in this way. Thus, the laser transceiver 111 can be adjustable in view of the transmission power in one embodiment. It is understood that a higher transmission power may be expedient for measuring relatively large distances R rather than for measuring relatively small distances R.

Moreover, the lens system 113 of the measuring unit 11 can be embodied to output the laser signal as a line-shaped (and not as a punctiform) laser signal. In certain applications, this allows a simpler and more exact distance measurement, e.g., if the camera system 1 is embodied as a hand camera system and the accurate alignment of the laser signal on the object 2 is correspondingly difficult. However, at the same time, the measuring unit 11 can be configured in such a way that the option of outputting the laser signal as a punctiform laser signal is also maintained. This may be advantageous in certain applications.

By way of example, the line-shaped laser signal has a (spatial) width B of at least 5 mm upon emergence from the measuring unit 11. The lens system 113 can have a front lens 1133 that completes the measuring unit 11, said laser signal emerging from the measuring unit 11 through said front lens. The laser signal has said width B at this location, wherein, in the present case, the term "width" should be understood to mean the length of the line-shaped laser signal, for example, a measure for the expansion of the laser signal in the form of a laser beam.

The front lens 1133 is configured as a plane glass lens, for example, and causes no further beam expansion (or beam tapering).

Figure 3A:
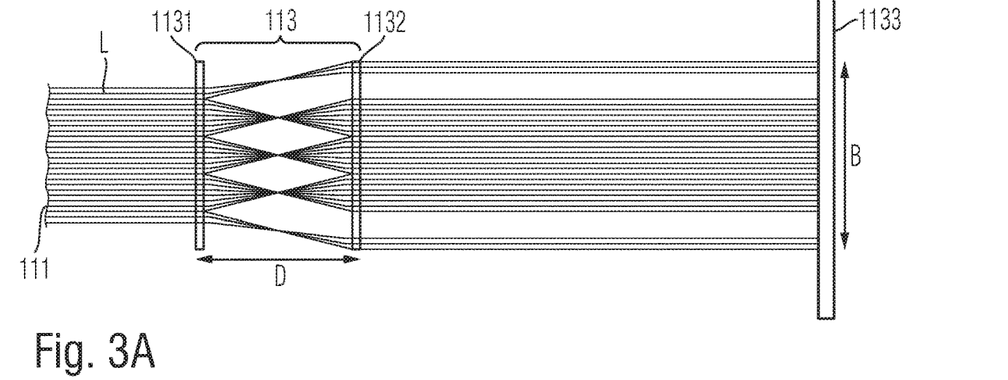
FIG. 3A-C each show a lens system according to one or more embodiments in a schematic and exemplary fashion.
Figure 3B:
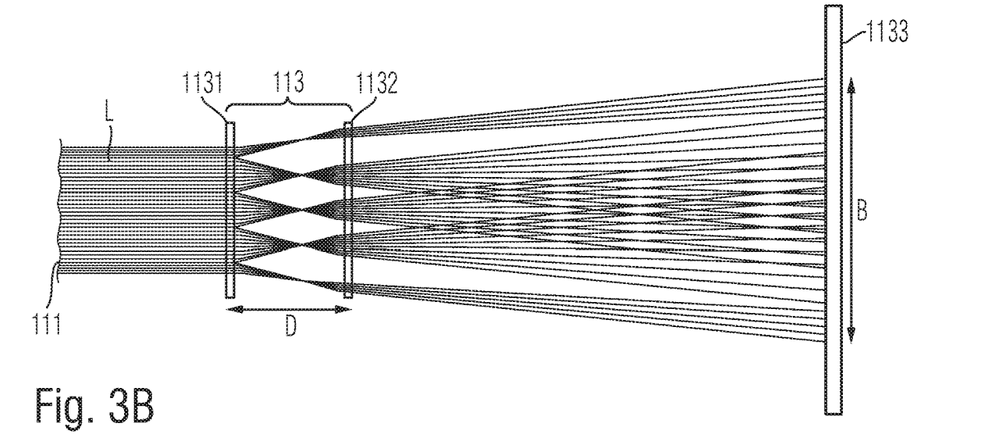
Figure 3C:
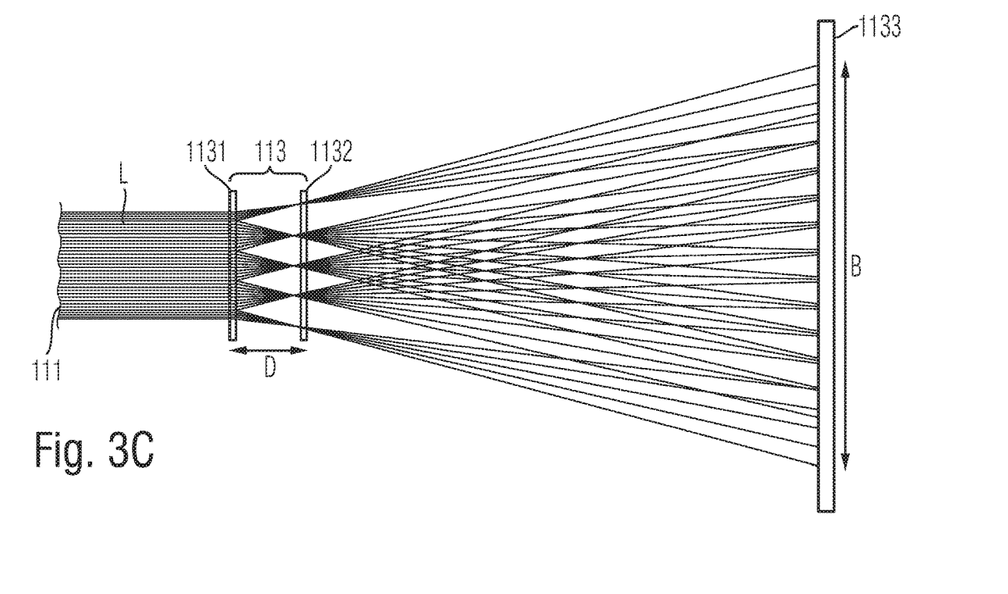

As will still be explained in more detail on the basis of FIGS. 3A-C, the width of the line-shaped laser signal at the front lens 1133 may depend on an expansion angle (divergence) at the second lens 1132. By way of example, said expansion angle lies in the range from 0 to 10° and depends, for example, on the distance D between the first lens 1131 and the second lens 1132.

By way of example, the lens system 113 is arranged and embodied in such a way that there is no intensity maximum at the front lens 1133. This increases the safety for the user of the camera system 1 and for further persons moving in the surroundings of the camera system 1.

By way of example, the laser signal crosses no further component of the measuring unit 11 after emerging from the front lens 1133 but instead directly strikes the object 2. Nevertheless, the latter aspect does not preclude the possibility of a supplementary lens (not illustrated) still being able to be arranged outside of the measuring unit 11. However, on account of the at least two lenses 1131, 1132 that are arranged in movable fashion relative to one another, too, this supplementary lens need not necessarily be replaced depending on the application; instead, the camera system 1 can make do with only a single supplementary lens, which may be securely assembled. By way of example, this supplementary lens is assembled on the measuring unit 11 in a manner that is secured and sealed against the environment.

The local width and/or divergence (angle expansion) of the line-shaped laser signal can be adjustable by adjusting the distance D between the at least two lenses 1131, 1132. Here, the measuring unit 11 can be embodied further to provide a second measurement signal 118, which is indicative for the width B of the line-shaped laser signal and/or for the distance D between the two lenses 1131, 1132. By way of example, this second measurement signal 118 can be supplied to the signal processing means (not illustrated here) of the camera controller 116 of the camera unit 10 which, for example on the basis of this second measurement signal 118, can prompt automatic setting of the camera unit 10. Moreover, a plausibility check can be implemented on the basis of the second measurement signal 118.

The two lenses 1131, 1132 can have an embodiment that is identical to one another. By way of example, each one of the two lenses 1131, 1132 is an acylindrical lens. The lenses can each be embodied as a spherical or as an aspherical lens. By way of example, both lenses 1131, 1132 have a rotationally symmetric embodiment, wherein an aspherical lens has no circular-segment-shaped cross-sectional profile, for example.

According to another embodiment, the two lenses 1131 and 1132 are each embodied as a lens array and each provided with a multiplicity of simple lenses (so-called "lenslets"). By way of example, the two lenses 1131 and 1132 are each embodied as a lens array with five simple lenses in the exemplary embodiment according to FIGS. 3A-C. The provision of simple lenses allows local maxima of power densities in the lens system 113 to be reduced and/or the lens system 113 to be provided with a smaller installation space.

According to an even further embodiment, the at least two lenses 1131, 1132 are arranged displaceable relative to one another along a direction perpendicular to the optical axis of the lens system 113, for example in a horizontal and/or vertical direction perpendicular to the optical axis. By way of example, the measuring unit comprises an adjustment element (not illustrated in the drawings), which is embodied to cause the relative displacement perpendicular to the optical axis. Said displacement allows the laser signal to be displaced on the object 2, for example in the case of an otherwise unchanged position and alignment of the camera system 1. By way of example, this allows scanning of the object 2, for example the creation of a distance profile. Such a distance profile, too, can be reproduced by the measurement signal 118 in one embodiment and can be communicated to the camera controller 116, for example. By way example, the adjustment element can comprise a piezo-drive in order also to bring about small and exact relative displacements, for example differences of less than one millimetre. In one embodiment, the first lens 1311 has a stationary arrangement and the second lens 1312 is movable not only along the optical axis (i.e., along the laser signal direction) but also along a direction perpendicular thereto. By way of example, the adjustment element is moved by the electric drive arrangement 114 for the purposes of causing said relative displacement, as it were with the second lens 1312 when the distance D is set.

As an alternative or in addition to the relative displacement of the at least two lenses 1131, 1132 along the direction perpendicular to the optical axis of the lens system 113, as described in the preceding paragraph, the laser transceiver 111 and/or a component thereof, such as, e.g., a transmission diode and/or a reception diode, can be arranged to be displaceable perpendicular to the optical axis of the lens system 113. By way of this type of displacement, too, the laser signal can be displaced on the object 2, for example in the case of an otherwise unchanged position and alignment of the camera system 1. By way of example, this allows scanning of the object 2, for example the creation of a distance profile. For the purposes of obtaining this option, it would also be conceivable to insert a prism and/or twistable plane glass between the at least two lenses 1131, 1132.

The measuring unit 11 can be embodied to be fastened in stationary fashion in the camera system 1. By way of example, a coupling site is provided in the camera system 1, the coupling site allowing the measuring unit 11 to be coupled at a defined position in relation to the position of the camera unit 10. Depending on how the camera unit 10 is arranged relative to the measuring unit 11, an offset value, which specifies the relative distance between the camera unit 10 and the measuring unit 11, can be stored in the evaluation unit 112, which outputs the measurement signal 119 specifying the distance between the camera unit 10 and the object 2. The evaluation unit 112 can be embodied to take account of this offset value when producing the measurement signal 119. As an alternative, such an offset value can also be provided in the signal processing means of the camera controller 116 of the camera unit 10.

Figure 2:
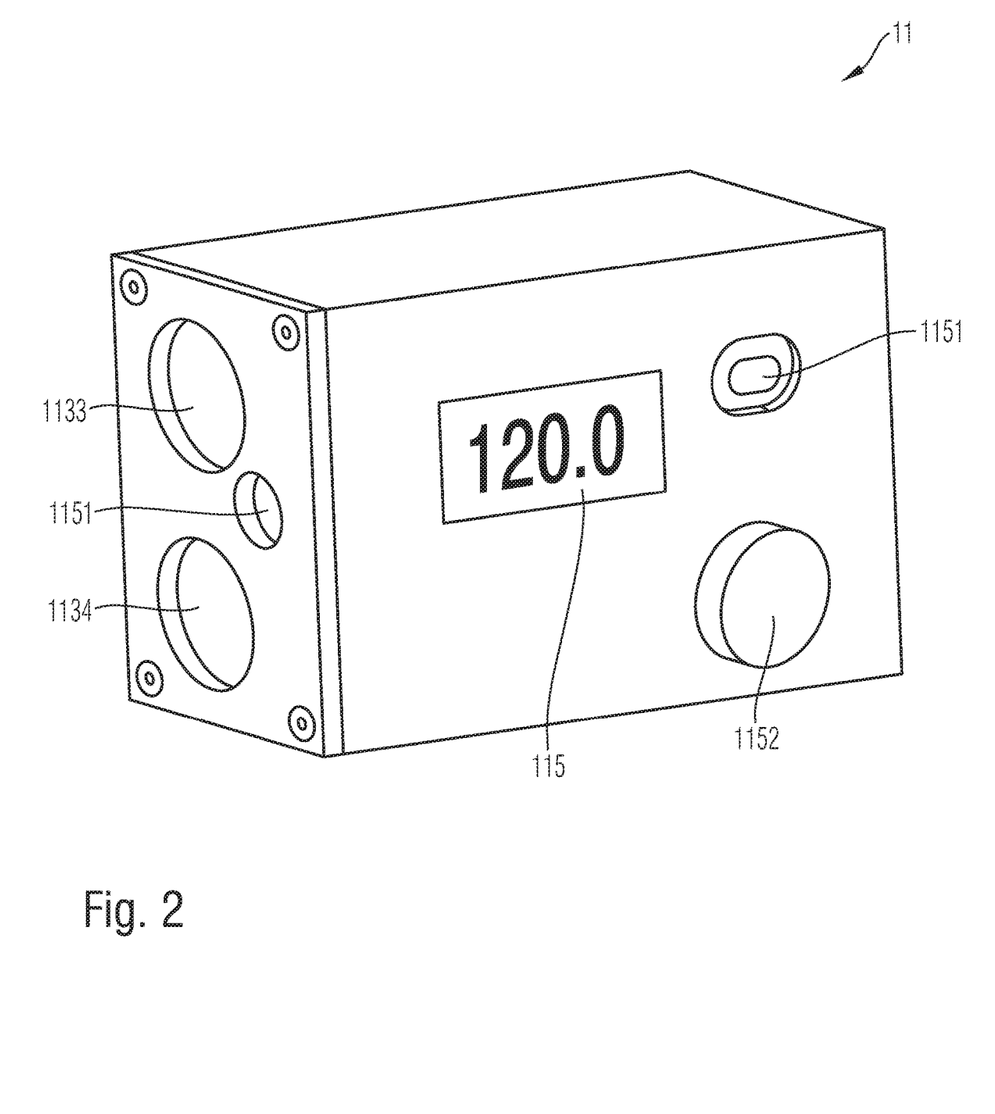
FIG. 2 shows a measuring unit according to one or more embodiments in a schematic and exemplary fashion.

FIG. 2 shows, in a schematic and exemplary fashion, a possible embodiment of the measuring unit 11. In general, provision can be made for the measuring unit 11 to be produced and traded separately and also independently of the camera system 1. By way of example, the measuring unit 11 can be embodied to be used in different camera systems. By way of example, the measuring unit 11 has a mechanical coupling site, which may also be standardized such that the coupling of the measuring unit 11 is successful in various camera systems. Moreover, the measuring unit 11 can comprise a communications interface (not shown here), which can be embodied at least for the transmission of the measurement signal 119 to the camera controller of the camera unit 10 and, optionally, also for the reception of the controller signal 1161. By way example, the measuring unit 11 can be data-coupled to the camera unit 10 by way of one or more cables or in wireless fashion.

Moreover, the measuring unit 11 can comprise a display unit 117, which is embodied to optically display the distance R to the object 2 on the basis of the measurement signal 119. Thus, a user of the camera system 1 always can identify the distance between the camera unit 10 and the object 2. Moreover, the measuring unit 11 can comprise operating elements 1151, 1152. By way of example, display setting of the display unit 117 can be modified by way of the operating element 1151. By way of example, the above-described offset value and/or the distance D can be set by way of the operating element 1152.

Consequently, it should be understood that, in one embodiment, the measurement signal 119 is displayed but there need not necessarily be automatic setting of the camera unit 10 on the basis of the measurement signal 119. By way of example, it still lies within the scope of the invention for a user of the camera system 1 to undertake manual setting of the camera unit 10 on the basis of the displayed measurement signal 119. In another embodiment, the measurement signal 119 is provided to the camera controller 116 of the camera unit 10 and the camera controller 116 of the camera unit 10 undertakes automatic setting of the at least one relevant parameter using signal processing means and/or an electromechanical adjustment mechanism. By way of example, there is an automatic focal length setting on the basis of the measurement signal 119 by means of an objective lens motor, as was explained above.

According to one embodiment, the measuring unit provides a first beam path for the transmission laser beam (which, e.g., passes through the lens system 113 with the lenses 1131, 1132 and 1133) and a second beam path for the received laser beam that was reflected (by the object 2), said second beam path, e.g., passing through an input lens 1134. The division into two separate beam paths for transmission laser beam and received laser beam may be expedient since the transmission laser beam is largely polarized, for example, whereas the received laser beam is usually unpolarized (diffuse). In another embodiment, transmission laser beam and received laser beam at least partly pass through the same optical components of the measuring unit 11; by way of example, a polarization beam splitter is provided in the first beam path, said polarization beam splitter passing the transmission laser beam without a change of direction and steering the received laser beam (reflected laser signal) into the second beam path.

By way of example, a laser signal with a low power is output by the outlet 1151, for example for the purposes of sighting before the actual measurement laser signal is output. By way of example, this laser signal lies in the visible spectrum and has a wavelength of 905 nm, for example. By way of example, this laser signal is configured in such a way that it is not detected by an image sensor.

Further, FIGS. 3A-C elucidate an embodiment of the lens system 113 with different distances D between the two lenses 1131, 1132 in a schematic and exemplary fashion. The laser signal L output by the laser transceiver 111 initially passes through the first lens 1131, after which it may experience a first expansion (see FIGS. 3A, B and C). Thereupon, the laser signal passes over a variable distance D until it strikes the second lens 1132. Depending on how far the two lenses 1131 and 1132 are spaced apart from one another and/or depending on how the second lens 1132 is configured, the laser signal either experiences no further expansion (variant according to FIG. 3A), an average expansion (variant according to FIG. 3B) or a relatively strong expansion (variant according to FIG. 3C). As mentioned previously, the distance D between the two lenses 1131 and 1132 can be continuously adjustable. As a result of the distance D between the two lenses 1131 and 1132 being adjustable, the divergence of the wide beam, for example, can be modified strongly with little adjustment travel and in a small installation space, as elucidated in FIGS. 3A-C by the different widths of the line-shaped laser signal upon emergence from the front lens 1133.

It also lies within the scope of the present invention for the laser transceiver 111 and the lens system 113 to be arranged according to an autocollimation design.

Figure 4:
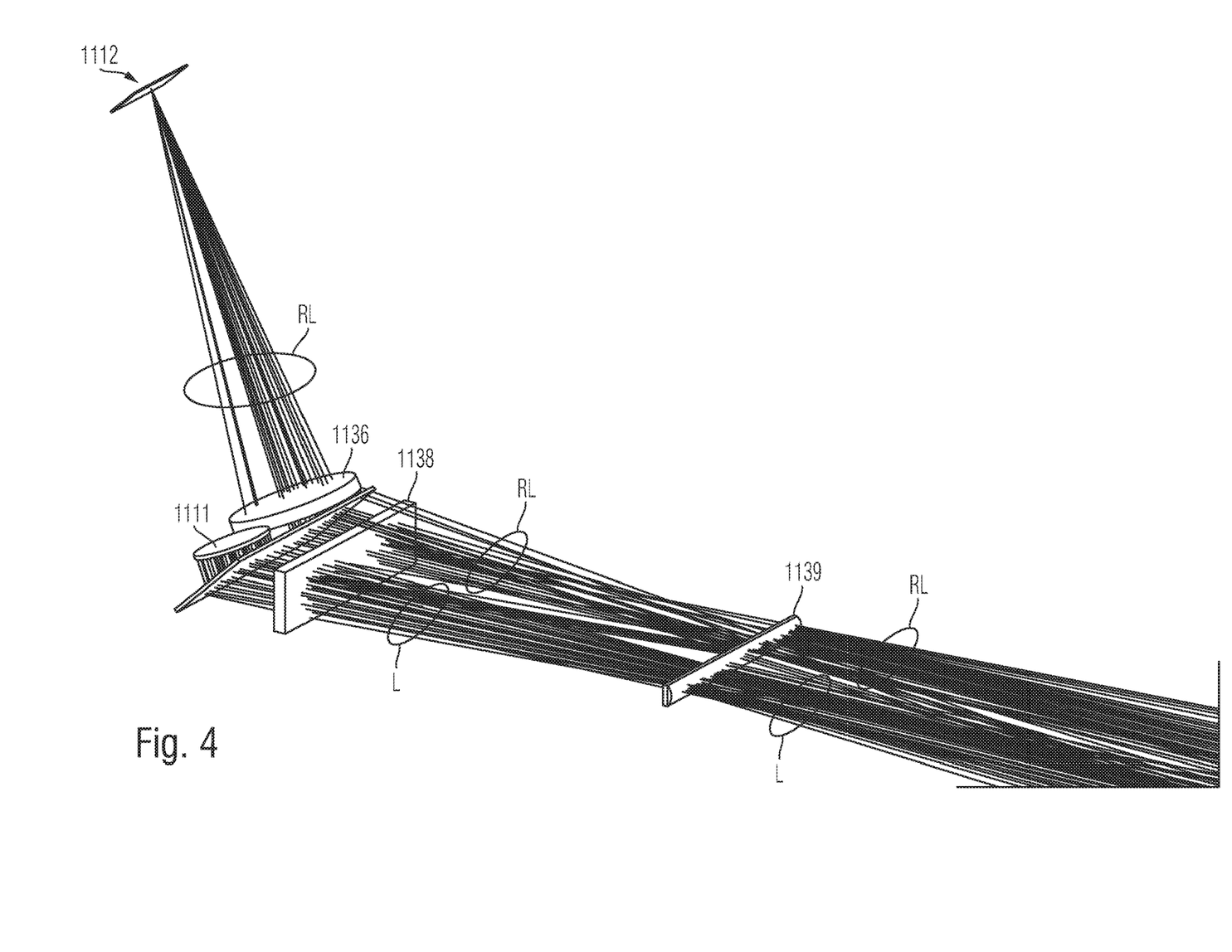
FIGS. 4-6 each show components of a measuring unit according to one or more embodiments in a schematic and exemplary fashion.

As elucidated in a schematic and exemplary fashion in FIG. 4, the laser transceiver 111 comprises, for example, a transmission part 1111, which outputs the laser signal L, and a receiver part 1112, which receives the reflected laser signal RL. Both the transmission part 1111 and the receiver part 1112 are coupled to the evaluation unit 112, for example.

It was already explained further above that the lens system 113 of the measuring unit 11 can be embodied to output the laser signal L as a line-shaped laser signal L. Such a line-shaped laser signal L also is elucidated in FIG. 4 (see the right-hand part of the drawing). The laser signal RL reflected by the object 2 then consequently is likewise line-shaped, as is also elucidated in FIG. 4.

The capture of the laser signal RL reflected by the object 2 forms the basis for establishing the correct distance R. The reflected laser signal RL is supplied to the receiver part 1112 of the laser transceiver 111, for example a sensor surface of the receiver part 1112. In order to facilitate a small installation size of the receiver part 1112, it may be advantageous to convert the originally line-shaped reflected laser signal RL into a substantially punctiform laser signal.

Figure 5A:
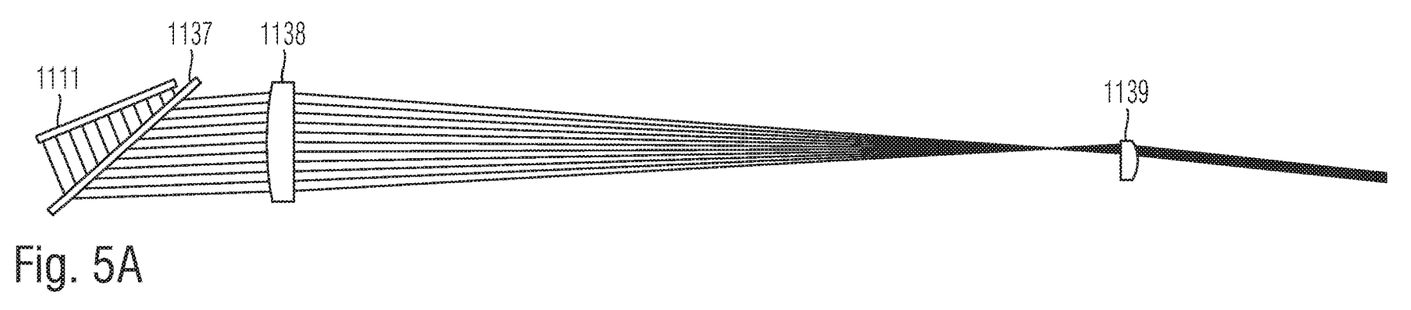

By way of example, the lens system 113 comprises a prism or diffraction grating 1137, and a first cylindrical lens 1138. The prism or diffraction grating 1137 receives the laser signal output by the transmission part 1111, and transmits it, depending on wavelength, to the first cylindrical lens 1138 in different directions. This wavelength-dependent transmission is elucidated in FIGS. 5A-C. A first portion of the laser signal output by the transmission part 1111 in a first wavelength range is transmitted to the first cylindrical lens 1138 with a positive angle to the optical axis, for example (FIG. 5A). A second portion of the laser signal output by the transmission part 1111 in a second wavelength range is transmitted to the first cylindrical lens 1138 with a negative angle to the optical axis, for example (FIG. 5C). A third portion of the laser signal output by the transmission part 1111 in a third wavelength range, which lies between the first and the second wavelength range, is transmitted to the first cylindrical lens 1138 in a manner substantially parallel to the optical axis, for example (FIG. 5B).

Further, the lens system 113 can comprise a second cylindrical lens 1139. By way of example, the second cylindrical lens 1139 is arranged at a fixed distance from the first cylindrical lens 1138. Since the laser signal can strike the first cylindrical lens 1138 in different directions, the laser signal is also transmitted accordingly to the second cylindrical lens 1139. Thus, the first portion of the first wavelength range strikes an upper portion of the second cylindrical lens 1139 (FIG. 5A), the second portion of the second wavelength range strikes a lower portion of the second cylindrical lens 1139 (FIG. 5C) and the third portion of the third wavelength range strikes a central portion of the second cylindrical lens 1139 (FIG. 5B).

Figure 5B:
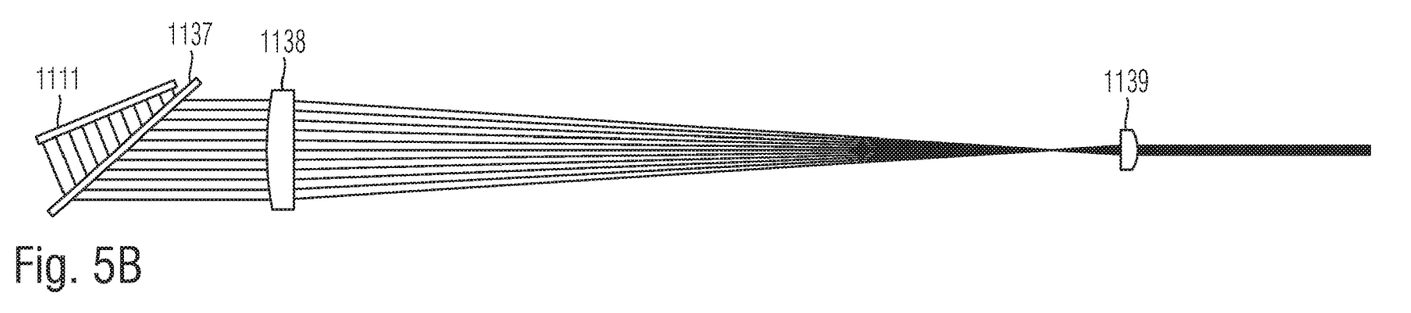
Figure 5C:
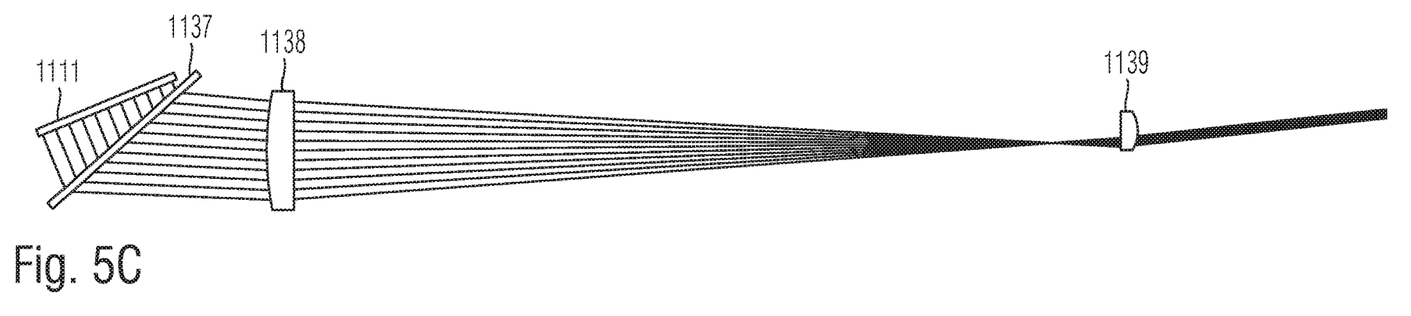

Consequently, the second cylindrical lens 1139 outputs a line-shaped laser signal, which can be imagined to be a combination of the output laser beams elucidated in FIGS. 5A-C (the beams, which depart from the second cylindrical lens 1139). In view of the spectral distribution, the line-shaped laser signal has an inhomogeneous embodiment in respect of its width. By way of example, the dominant wavelength portion changes continuously along the width of the line-shaped laser signal.

Referring back to the exemplary embodiment according to FIG. 4, the reflected laser signal RL can take the same beam path as the emitted laser signal L, only in the reverse direction. In particular, the reflected laser signal in one embodiment initially passes through the second cylindrical lens 1139, the first cylindrical lens 1138 and, following this, the diffraction grating or prism 1137. After this, the reflected laser signal strikes a further lens 1136 of the lens system 113, which guides a width-reduced reflected laser signal to the receiver part 1112.

Figure 6:
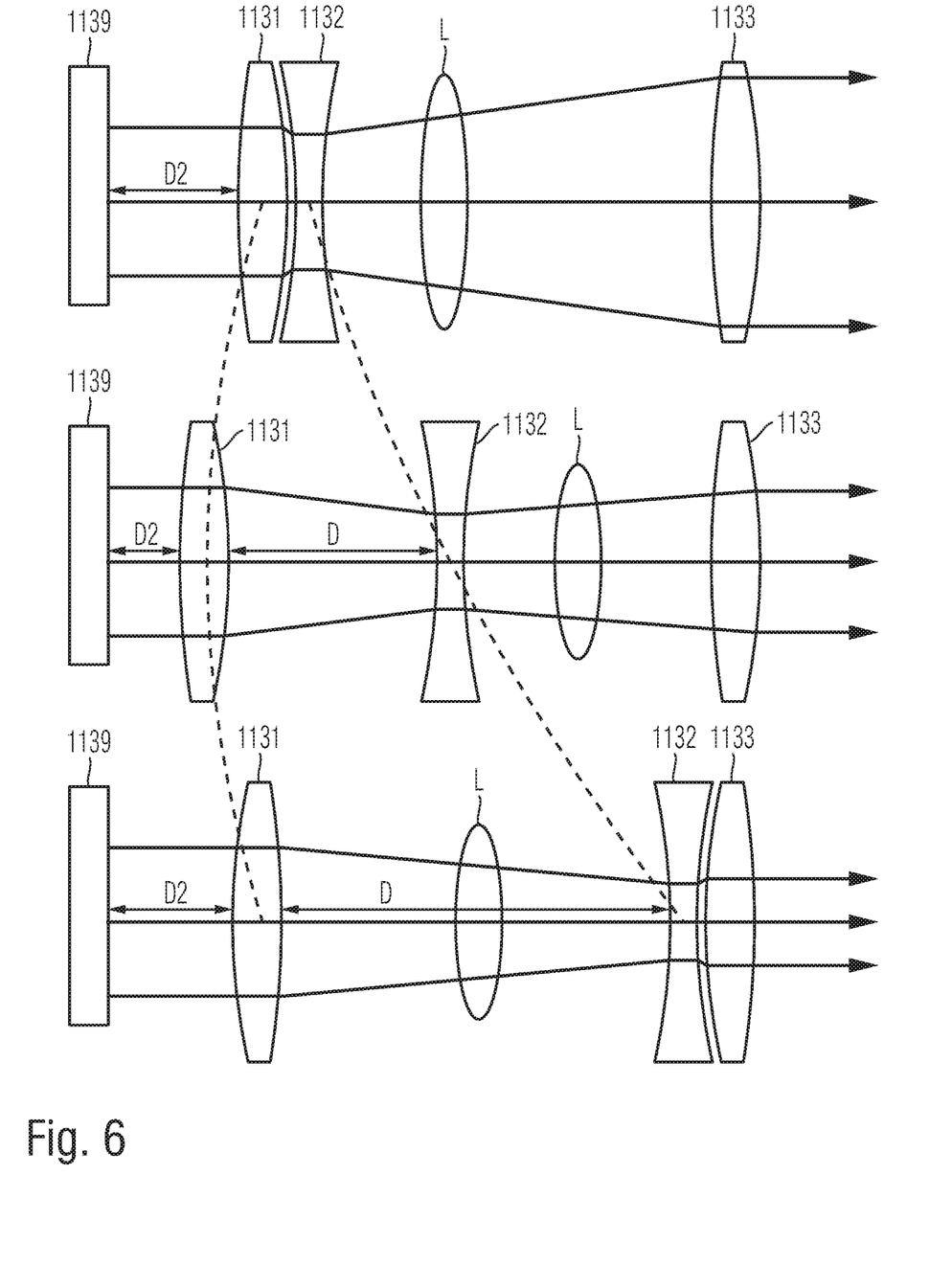

According to the exemplary embodiment in FIG. 6, the line-shaped laser signal output by the second cylindrical lens 1139 is supplied to the arrangement, described in an exemplary manner above, with the first lens 1131 and the second lens 1132 and also the front lens 1133, wherein at least a distance D between the two lenses 1131 and 1132 is adjustable. Moreover, the distance D2 between the second cylindrical lens 1139 and the first lens 1131 is also variably adjustable in one embodiment.

In one embodiment, the arrangement made of the first lens 1131 and the second lens 1132 and the front lens 1133 forms an afocal zoom system of the lens system 113. By way of example, the afocal zoom system is embodied to output the line-shaped laser signal with a variable width.

As used herein, the terms "having", "containing", "including", "comprising" and the like are open terms, which indicate the presence of listed elements or features without, however, precluding additional elements or features.

In view of the aforementioned scope of variations and applications, reference is made to the fact that the present invention is not restricted by the aforementioned description, and nor is it restricted by the attached drawings. Instead, the present invention is only restricted by the following claims and the legal equivalents thereof.

The invention claimed is:

1. Camera system, comprising:
   a camera unit for capturing still and/or moving images of an object, wherein the camera unit is adjustable in respect of at least one parameter that is relevant to the capture of the still and/or moving images on the basis of a measurement signal;
   a measuring unit for capturing a distance between the object and the camera unit, wherein the measuring unit comprises:
   (i) a laser transceiver for emitting a laser signal and for receiving a laser signal reflected by the object;
   (ii) an evaluation unit that is coupled to the laser transceiver and that is embodied to provide the measurement signal, wherein the measurement signal is indicative for the distance between the object and the camera unit; and
   (iii) a lens system, which has at least two spaced apart lenses, the laser signal emitted by the laser transceiver passing through said lens system, wherein at least one of the lenses is arranged in movable fashion such that the distance between the at least two lenses is variably adjustable parallel to the laser signal transmission direction, wherein the lens system further has a front lens, through which the laser signal emerges from the measuring unit such that it can strike the object without further crossing of a component of the measuring unit.

2. Camera system according to claim 1, wherein the lens system of the measuring unit is embodied to output the laser signal as a line-shaped laser signal.

3. Camera system according to claim 2, wherein the line-shaped laser signal has a width of at least 5 mm upon emergence from the measuring unit.

4. Camera system according to claim 3, wherein the divergence, width, or both, of the line-shaped laser signal is adjustable by adjusting the distance between the at least two lenses.

5. Camera system according to claim 2, wherein the measuring unit is embodied to provide a second measurement signal, which is indicative for the width of the line-shaped laser signal, for the distance between the at least two lenses, or both.

6. Camera system according to claim 1, wherein the distance between the at least two lenses is continuously adjustable.

7. Camera system according to claim 1, wherein the at least two lenses have a mutually identical embodiment.

8. Camera system according to claim 1, wherein the measuring unit has an electric drive arrangement, which is embodied to set the distance between the at least two lenses.

9. Camera system according to claim 8, further comprising a remote control, wherein the electric drive arrangement is embodied to set the distance between the at least two lenses on the basis of a control signal output by the remote control.

10. Camera system according to claim 1, wherein the at least one parameter that is relevant to the capture of the still and/or moving images is the following: an image sharpness, a resolution, a focal length, a focus, a lens position, or a control parameter relating to image stabilization.

11. Camera system according to claim 1, wherein the measuring unit is embodied to be fastened in stationary fashion in the camera system.

12. Camera system according to claim 1, wherein the measuring unit has a display unit, which is embodied to optically display the distance on the basis of the measurement signal.

13. Camera system according to claim 1, wherein the camera unit comprises a camera controller, which is coupled to the measuring unit and which is embodied to receive the measurement signal, to provide a controller signal to the measuring unit, or both.

14. Camera system according to claim 13, wherein the camera controller is embodied to set at least one of a transmission power of the laser transceiver and the distance between the two lenses of the lens system by means of the controller signal.

15. Camera system according to claim 1, wherein the at least two lenses are arranged displaceably relative to one another along a direction perpendicular to an optical axis of the lens system.

16. Camera system according to claim 1, wherein the lens system comprises a diffraction grating or a prism through which the laser signal passes before it strikes the at least two lenses.

17. Camera system according to claim 1, wherein the lens system comprises an afocal zoom system.

* * * * *

UNITED STATES PATENT AND TRADEMARK OFFICE
CERTIFICATE OF CORRECTION

| | |
|---|---|
| PATENT NO. | : 10,627,515 B2 |
| APPLICATION NO. | : 16/217517 |
| DATED | : April 21, 2020 |
| INVENTOR(S) | : Julius Muschaweck et al. |

It is certified that error appears in the above-identified patent and that said Letters Patent is hereby corrected as shown below:

On the Title Page

Item (73), delete "SINE" and insert -- CINE --, therefor.

Signed and Sealed this
Sixteenth Day of June, 2020

Andrei Iancu
*Director of the United States Patent and Trademark Office*